United States Patent
Tudor et al.

(10) Patent No.: US 8,531,602 B1
(45) Date of Patent: Sep. 10, 2013

(54) AUDIO ENHANCEMENTS FOR MEDIA

(75) Inventors: Alexandru Tudor, Birmensdorf (CH); Tamas Foldenyi, Vienna (AT); Klas Olof Daniel Andersson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/347,694

(22) Filed: Jan. 10, 2012

Related U.S. Application Data

(60) Provisional application No. 61/548,946, filed on Oct. 19, 2011.

(51) Int. Cl.
*H04N 7/12* (2006.01)

(52) U.S. Cl.
USPC .......................................................... 348/485

(58) Field of Classification Search
USPC ................. 348/480–485, 738, 736; 704/500, 704/270; 381/1, 56, 306, 124; 713/179, 713/176
See application file for complete search history.

(56) References Cited

U.S. PATENT DOCUMENTS

| | | | | |
|---|---|---|---|---|
| 6,154,484 | A * | 11/2000 | Lee et al. | 375/130 |
| 7,042,519 | B2 * | 5/2006 | Lim | 348/627 |
| 7,254,540 | B2 * | 8/2007 | Fay et al. | 704/270 |
| 7,327,848 | B2 * | 2/2008 | Squibbs | 381/56 |
| 7,801,910 | B2 * | 9/2010 | Houh et al. | 707/765 |
| 7,904,301 | B2 * | 3/2011 | Densham et al. | 704/500 |
| 8,014,332 | B2 | 9/2011 | Oh et al. | |
| 8,144,612 | B2 * | 3/2012 | Johnson et al. | 370/252 |
| 8,351,622 | B2 * | 1/2013 | Suzuki et al. | 381/119 |
| 8,351,843 | B2 * | 1/2013 | Dillon et al. | 455/3.01 |
| 2012/0024131 | A1 * | 2/2012 | Georges et al. | 84/645 |
| 2012/0195433 | A1 * | 8/2012 | Eppolito et al. | 381/1 |

OTHER PUBLICATIONS

Snapshot of www.youtube.com/editor_3d taken on Mar. 22, 2011 as provided by Internet ArchiveWayback Machine. Found at http://web.archive.org/web/20110322192449/http://www.youtube.com/editor_3d, last accessed Apr. 12, 2012.

Altnet Launches Global File Registry, P2P File Sharing, http://www.p2p-weblog.com/50226711/altnet_launches_global_file_registry.php, Last accessed Apr. 12, 2012.

Global File Registry, http://www.globalfileregistry.com/assets/Global_File_Registry_White_Paper.pdf, Last accessed Apr. 12, 2012.

* cited by examiner

*Primary Examiner* — Paulos M Natnael
(74) *Attorney, Agent, or Firm* — Turocy & Watson, LLP

(57) ABSTRACT

Systems and methods for audio enhancements of media items are disclosed herein. When a media item such as a video that includes suitable audio content (e.g., a musical composition) is created and/or designated for upload to a video hosting site, an audio reference (e.g., a higher quality version of the musical composition) that matches the audio content can be automatically identified. A timing offset can be automatically determined and enhanced audio can be constructed by mixing the audio reference and the audio content aligned according to the timing offset.

30 Claims, 13 Drawing Sheets

Results indicate timing offset 114 equals ~ 8.5 seconds, indicating that the results are not entirely reliable since the correct value is known to be ~0.5 seconds.

AUDIO ENHANCEMENTS FOR MEDIA

CROSS-REFERENCE TO RELATED APPLICATIONS

This application claims the benefit of U.S. Provisional Application No. 61/548,946, filed Oct. 19, 2011 and entitled AUDIO ENHANCEMENTS FOR MEDIA, the entirety of which is incorporated herein by reference.

TECHNICAL FIELD

This disclosure generally relates to enhancing audio associated with a media item.

BACKGROUND

User-created media content (e.g., videos) typically includes audio content (e.g., music tracks) that is of lower sound quality because of the limitations of the average consumer camera employed to create the media content and/or a lack of post-processing skills or tools that might be utilized to enhance the audio for the media content. Even with sufficient know-how and suitable tools to improve the audio of one's own media content, post-processing such media content to improve the audio can be time-consuming.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to enhancing audio associated with a media item (e.g., a video that includes certain audio content portions). An identification component can be configured to identify an audio reference that matches a particular type of audio content (e.g., a musical composition) included in the media item. An offset component can be configured to determine a timing offset between the audio reference and the audio content. A mixing component can be configured to construct enhanced audio that is an audio processing mix of the audio reference and the audio content aligned in accordance with the timing offset.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
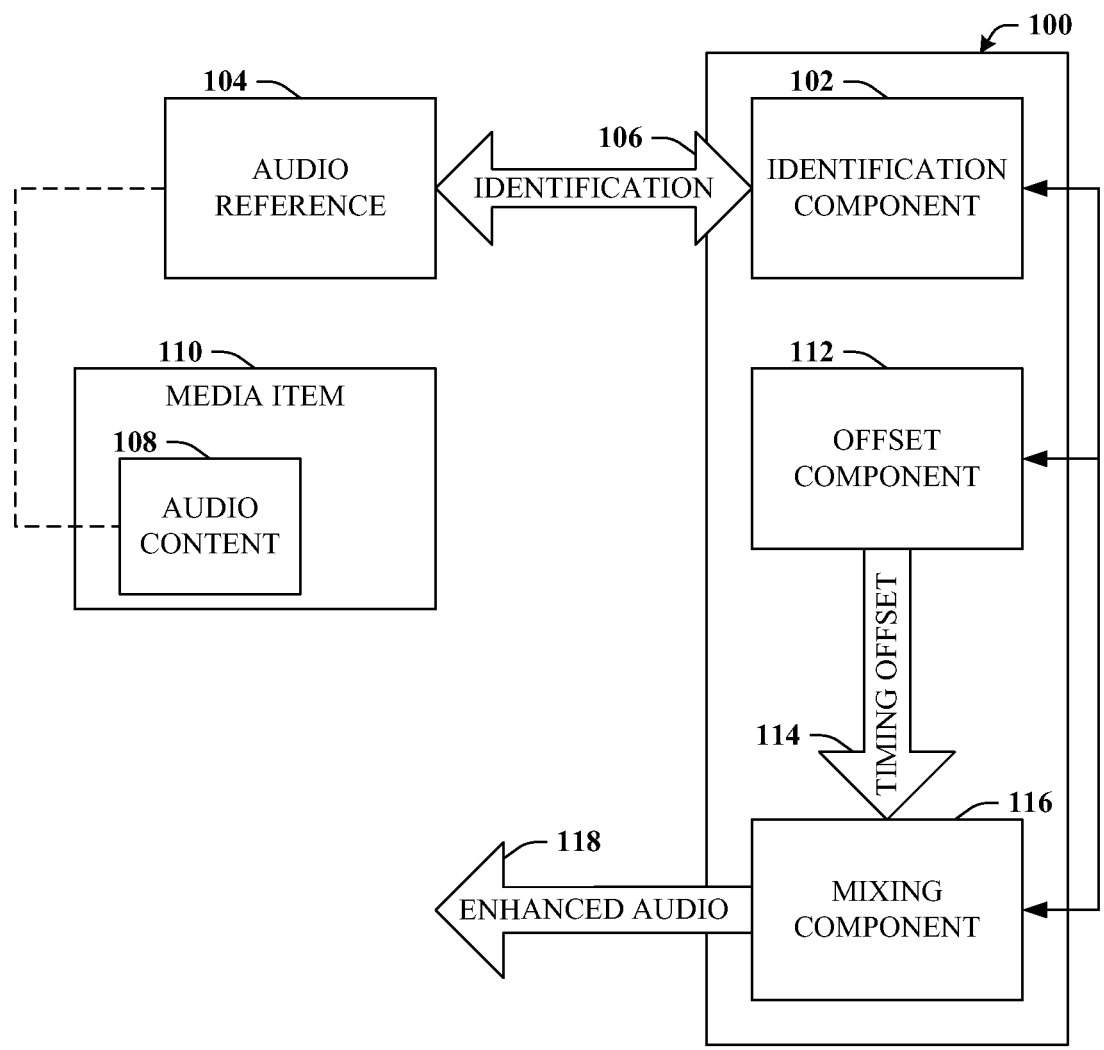
FIG. 1 illustrates a high-level functional block diagram of an example audio enhancement system.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Systems and methods disclosed herein relate to enhancing audio associated with media items. For example, when a media item is created, e.g., with a video recording device, certain portions of audio can be of lower quality. By way of illustration, consider a first scenario in which a candidate for a political office creates a video in which the candidate describes his political views and platform. While delivering the speech, an inspiring rendition of a national anthem plays in the background aimed at inspiring any who would later view the video. As another example, consider a second scenario in which a dancer creates a video audition in which she performs her dance routine to a traditional music composition. In both scenarios, it is possible to enhance the audio according to post processing techniques that utilize a high quality version of the music (or other audio content) playing in the background of either video.

Traditionally, if a user or other party or entity associated with the media item chose to improve the audio content of his or her video (or other media content) with a higher quality version of the audio, such would be a time-consuming, manual process. For example, this process might require the user to identify the audio content (e.g., a particular song or particular version of a song that is present in the media item) and locate a higher quality version of that audio content. In addition, the user must also identify and acquire suitable tools that can be used to edit the media item, and further must invest the time necessary to learn how to use those tools. Finally, the user must then manually position the high quality audio on the correct position of the audio channel, which is often a non-trivial task. Otherwise, the post-processing might yield an echo-effect or other undesirable results.

The systems and methods disclosed herein can improve the audio quality of a media item automatically. For example, the disclosed subject matter can automatically identify a reference audio track (e.g., a high quality version of the national anthem described in the first scenario or a high quality version of the traditional music composition described in the second scenario) that is initially included in the audio channels of the media item (typically encoded according to a lower quality). Once a suitable reference audio is identified, the reference audio can be acquired and mixed (e.g., audio processing mixing) with the media item so other (e.g., non-music) sounds included in the media item can be preserved. Further, during the mixing procedure, a suitable timing offset can be determined automatically. Thus, the user is not required to identify or provide the high quality reference audio, and is not required to manually determine the correct timing offset required for proper mixing of the audio channels. Rather, these and other improvements can be accomplished automatically, and can therefore be as simple and convenient as selecting a check-box in a user interface.

Initially, the audio reference can be identified by a content identification system that can, e.g., examine the media content in conjunction with searching a data store of (high quality) audio references. While the content identification system can provide an initial offset based upon the examination, a more precise offset might be beneficial. In particular, the timing offset should be fine enough to avoid discernible echo effects or other undesired audio effects.

One way to produce the timing offset is to try out multiple shifting of the audio stream of the audio reference over an audio stream of the original audio content. According to a first example calculation, the corresponding sampling points of the shifted audio streams are multiplied together and the sum of these products are calculated. The shifting with the largest sum corresponds to a correct offset because matching peaks greatly increase the sum. According to a second example, a sum of the quadratic difference of each corresponding sampling points of the two shifted audio streams can be calculated. The shifting with the smallest sum corresponds to a correct offset because small differences between the two waveforms result in a small sum. It is appreciated that the initial offset provided by the content identification system can be used as a starting point so only offsets near this rough offset need be considered.

Implementation of the disclosed subject matter can vary. For example, a video editing tool or tool utilized to upload the media content to a media hosting site can provide an option to automatically enhance the audio of the media content. Thus, the user can select an effects view of the media item and simply check a related checkbox to improve the audio automatically. In one or more embodiments, the check box can be visible and/or selectable (e.g., ghosted when not selectable) only if a suitable audio reference has been located by the content identification system. Further, typically after selecting the check-box (or otherwise requesting automatic audio enhancement), the user can decide the mixing ratio between the audio reference and the original audio content, e.g., by adjusting a slider that controls the mixing ratio. If the media content has a substantial amount of unique sounds, then the user might desire a higher bias toward the original audio content during the mixing process. For example, in the first scenario described above, the candidate delivering a political speech might desire the mixing ratio be biased toward the original audio to accentuate his speech. On the other hand, if the media item has few or no unique sounds that are important to the production, then the user can favor the high quality audio reference during the mixing process. The second scenario described above relating to a dance audition provides an example in which the user might prefer to adjust the mixing ratio toward the audio reference.

In one or more embodiments, a preview feature can be provided, e.g., integrated into an editor or other tool. The preview feature can provide a presentation of the media item with the enhanced audio included. For example, the preview feature can present the media item and cycle back and forth at intervals (e.g., every five seconds) between the enhanced audio and the original audio content. This can allow the user to quickly gauge the differences between the enhanced audio and the original audio content and/or the differences between other editing performed on the media item. In one or more embodiments, the preview feature can be enabled/disabled via a check box or other suitable user interface object.

In one or more embodiments, the disclosed audio enhancements can be offered to a user at the time of upload of the media item to a media content hosting site. Thus, if the high quality audio reference is available at the time of upload or subsequently becomes available, the disclosed audio enhancements can be performed, e.g., by embedding the enhanced audio into a file associated with the media item. Additionally or alternatively, the disclosed audio enhancements can be performed "on-the-fly." For example, the file associated with the media item can remain in original form, yet the audio enhancements can be applied when the media item is accessed by a content consumer. In this latter embodiment, the content consumer can opt-in and/or opt-out of a presentation with enhanced audio. The opt-in and/or opt-out can therefore be based upon conditions associated with the content consumer rather than primarily relying on conditions associated with the user associated with the media item (e.g., the content consumer might have access to a different set of audio references, or might agree to certain behavior or constraints to gain access to the enhanced version, or pay for the enhanced version, etc.).

Example Audio Enhancements

Referring now to FIG. 1 audio enhancement system 100 is depicted. System 100 can include a memory that stores computer executable components and a processor that executes computer executable components stored in the memory, an example of which can be found with reference to FIG. 10. In addition, system 100 can include identification component 102 that can be configured to identify audio reference 104 by way of identification 106. The identification component 102 may be, for example, a content identification system such as that described above. Identification 106 can be accomplished, e.g., by examining audio content 108 included in media item 110 and comparing audio content 108 to a data store of various audio references. Thus, identification 106 can occur when identification component 102 locates audio reference 104 that matches audio content 108.

In one or more embodiments, media item 110 can be a video designated for upload to a video content hosting site by a user associated with the video (e.g., a creator, curator, etc. of video). Audio reference 104 can be a high quality version of audio content 108 included in media item 110. For example, audio reference 104 can be a high quality digital version of a song that is featured in media item 110, but typically encoded in media item 110 according to an inferior quality due to inherent limitations of the equipment or knowledge utilized to produce media item 110.

System 100 can further include offset component 112 that can be configured to determine timing offset 114 between audio reference 104 and audio content 108. It is appreciated that an initial offset can, in some instances be determined during identification 106, yet, this initial offset is not typically precise enough to serve the quality objectives of many users. However, the initial offset can be employed as a baseline guide for determining the (more precise) timing offset 114.

In one or more embodiments, offset component 112 can determine timing offset 114 by overlaying one audio stream (e.g., audio reference 104) on top of the other audio stream (e.g., audio content 108) and performing many cross correlations at each overlay or shift. In particular, analysis of a comparison of the two overlaid audio streams can be performed for a particular offset, then one audio stream can be shifted relative to the other by a particular increment and the same comparison can be performed, typically until all shifts within a predetermined shift range have been processed. When comparing the two audio streams at a given time shift, the samples of both streams can be multiplied. Thus, when peaks associated with the respective audio streams are aligned, large positive peaks and large negative peaks can both contribute considerably to determining timing offset 114. Once the results for the various calculated shifts have been gathered, timing offset 114 can be selected from among these results, generally, the comparison that yields the best fit.

As one example to find the best fit, offset component 112 can employ a correlation calculation that calculates the sum of the products of sample values at multiple points for the overlaid streams and for each shift. The shift with the maximal sum of the products can be selected as timing offset 114. As another example to find the best fit, offset component 112 can be further configured (1) to analyze N calculated shifts between audio reference 104 and audio content 108, where N is an integer, (2) to calculate a sum of a quadratic difference for the N calculated shifts respectively, and (3) to select a calculated shift from among the N calculated shifts with a minimal sum as timing offset 114. In this example, the shift with the minimal sum can be selected as the best fit and designated as timing offset 114.

The following example pseudocode provides an example algorithm for cross-correlating the two audio streams according to multiple shift values:
Cross correlation:
for (shift=−max_shift; shift<max_shift; shift++)
 corr[shift]=SUM (audioA[i]*audioB[i+shift])
timeshift=shift value of MAX(corr[shift])

Further, many comparison points of the overlaid streams can be averaged together during the cross correlation, which can significantly reduce processing time. Experimentation indicates a trade-off between speed and reliability of the results when averaging multiple samples together. When employing audio streams with a duration of 20 seconds each, at a rate of 44100 samples per second, the following results included in Table I. were obtained:

TABLE I

| No. of samples averaged | Processing Time | Reliability |
| --- | --- | --- |
| 10 | ~45 seconds | Very Good |
| 32 | ~13 seconds | Very Good |
| 64 | ~3 seconds | Good |
| >64 | <3 seconds | Not always Reliable |

It is understood that when calculating offset 114, offset component 112 can average x samples together, where x can be substantially any integer greater than 1. In the above example, a suitable default value for x can be between 32 and 64, but it is appreciated that in other examples, other values of x can be selected. Furthermore, offset component 112 can adjust the value of x based upon various criteria. For example, offset component 112 can employ a default value for x (e.g., x=64), yet adjust this value based upon characteristics associated with the two audio streams, input from a user, input from a system administrator, etc. It is further understood that the duration of both audio streams are not required to be identical. For example, a cross correlation can be performed while utilizing a very short audio duration for one of the audio streams shifted over a much longer audio during for the second audio stream.

Figure 2A:
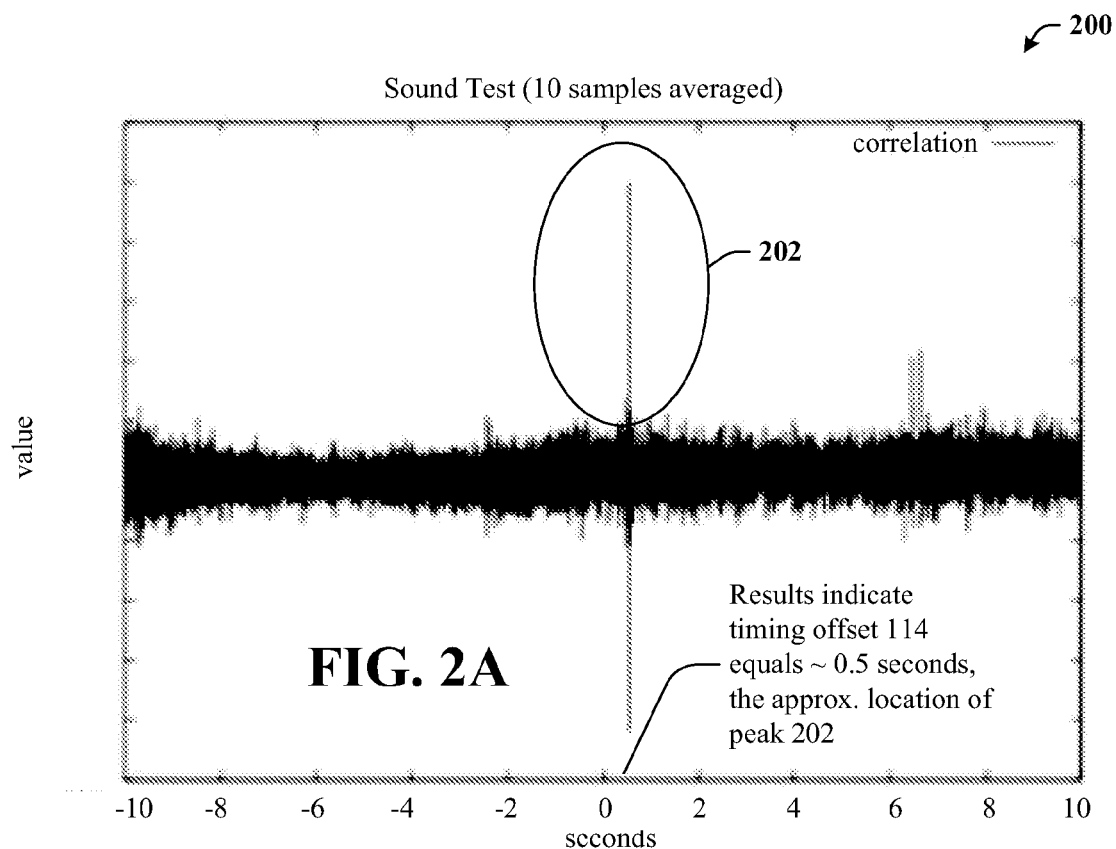
FIGS. 2A-2E depict various results of example cross correlations of audio streams.
Figure 2B:
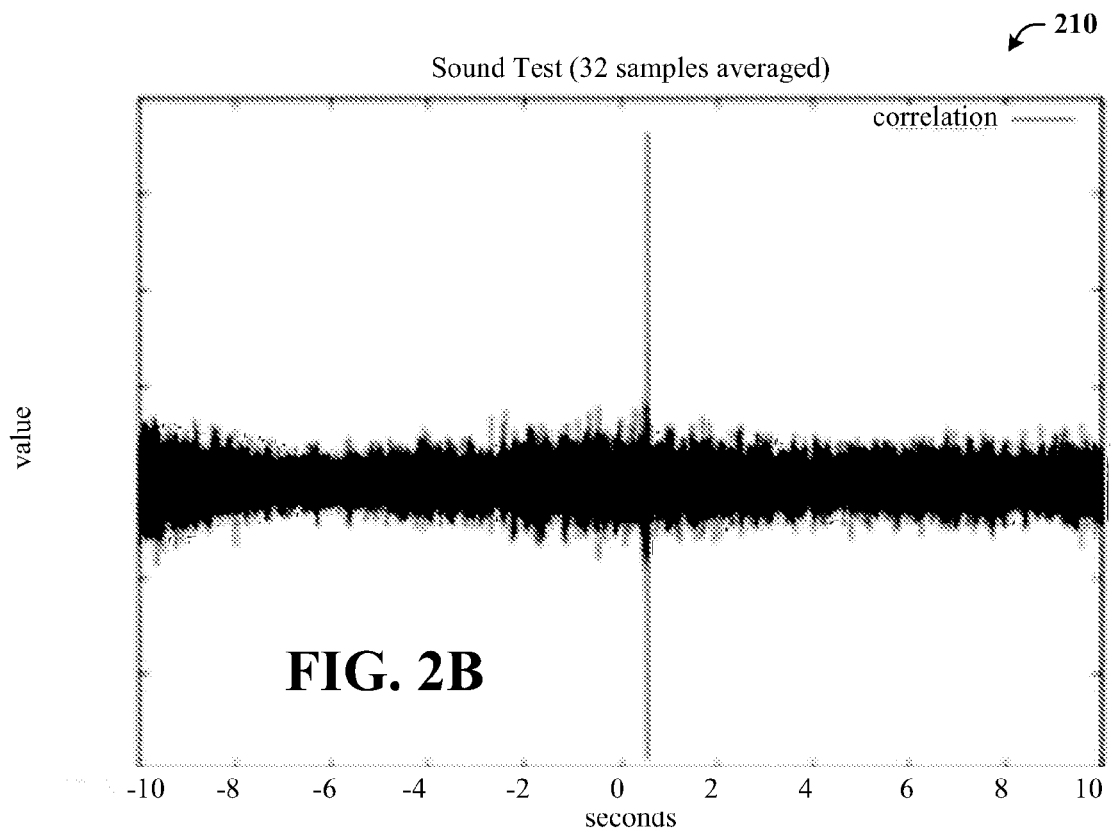
Figure 2C:
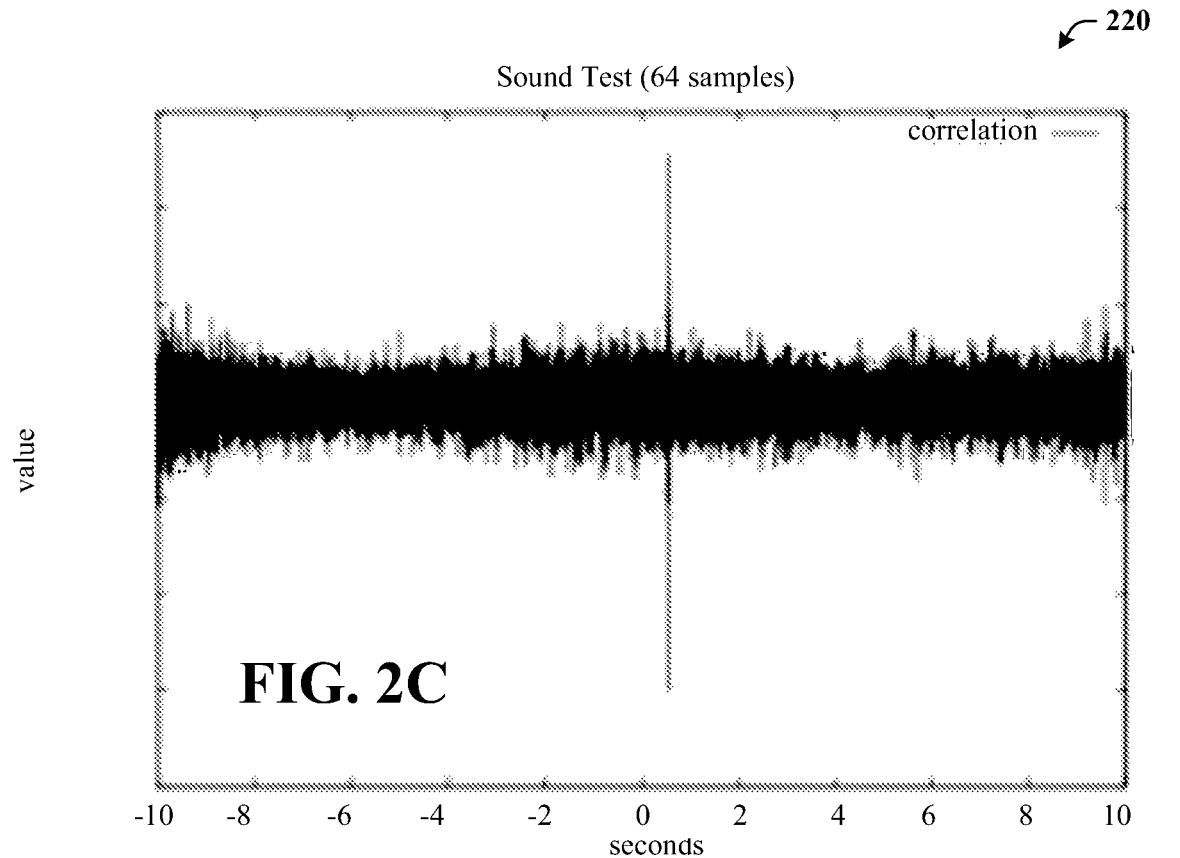

With reference now to FIGS. 2A-2E various results of an example cross correlation are provided. FIG. 2A depicts example results 200 when averaging together 10 samples at a time. Here the definitive peak is identified by reference numeral 202. This peak occurs at approximately 0.5 seconds. Accordingly, offset component 112 can determine timing offset 114 is approximately 0.5 seconds. FIG. 2B depicts example results 210 when averaging together 32 samples at a time. As can be seen, these results yield the same value for timing offset 114, yet processing time can be reduced by about 70% since more samples are processed (e.g., averaged together) at a time. FIG. 2C depicts example results 220 when averaging together 64 samples at a time. Again, the correct value for timing offset 114 can be identified (e.g., 0.5 seconds), yet processing time can be reduced by over 90% compared to the processing time when averaging together 10 samples at a time.

Figure 2D:
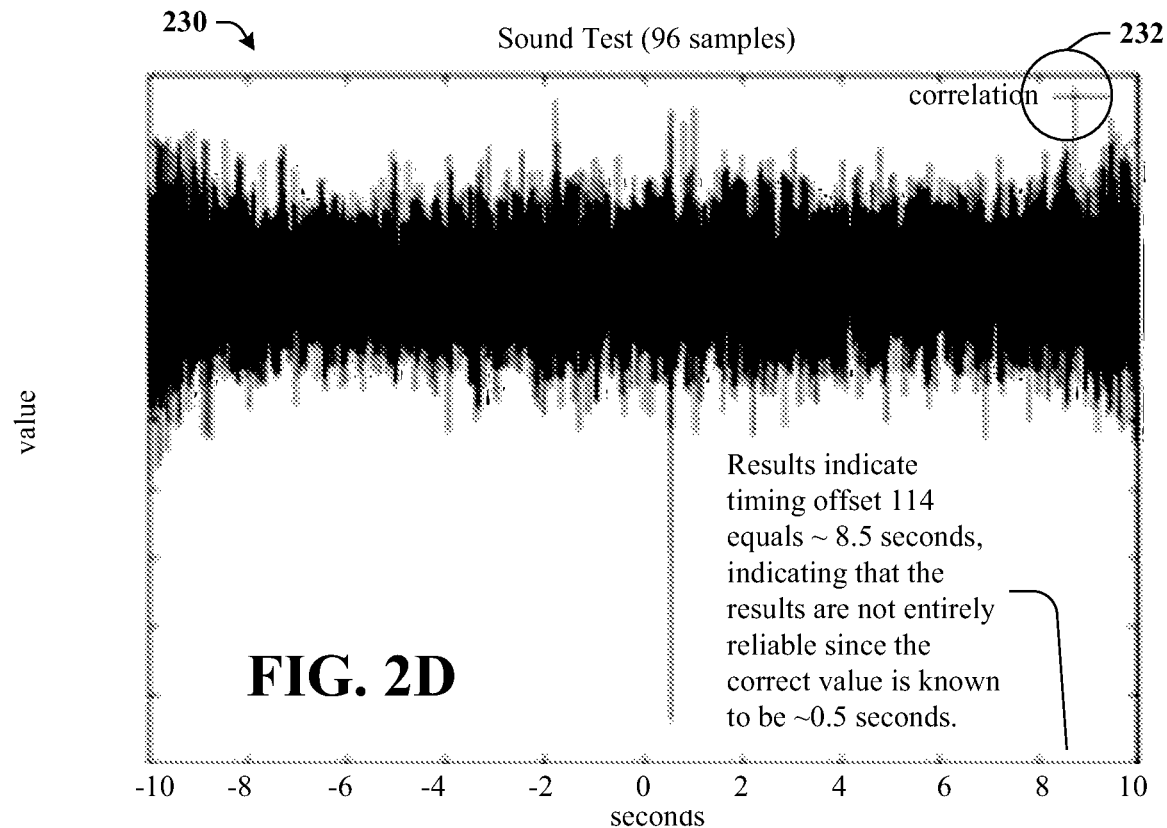
Figure 2E:
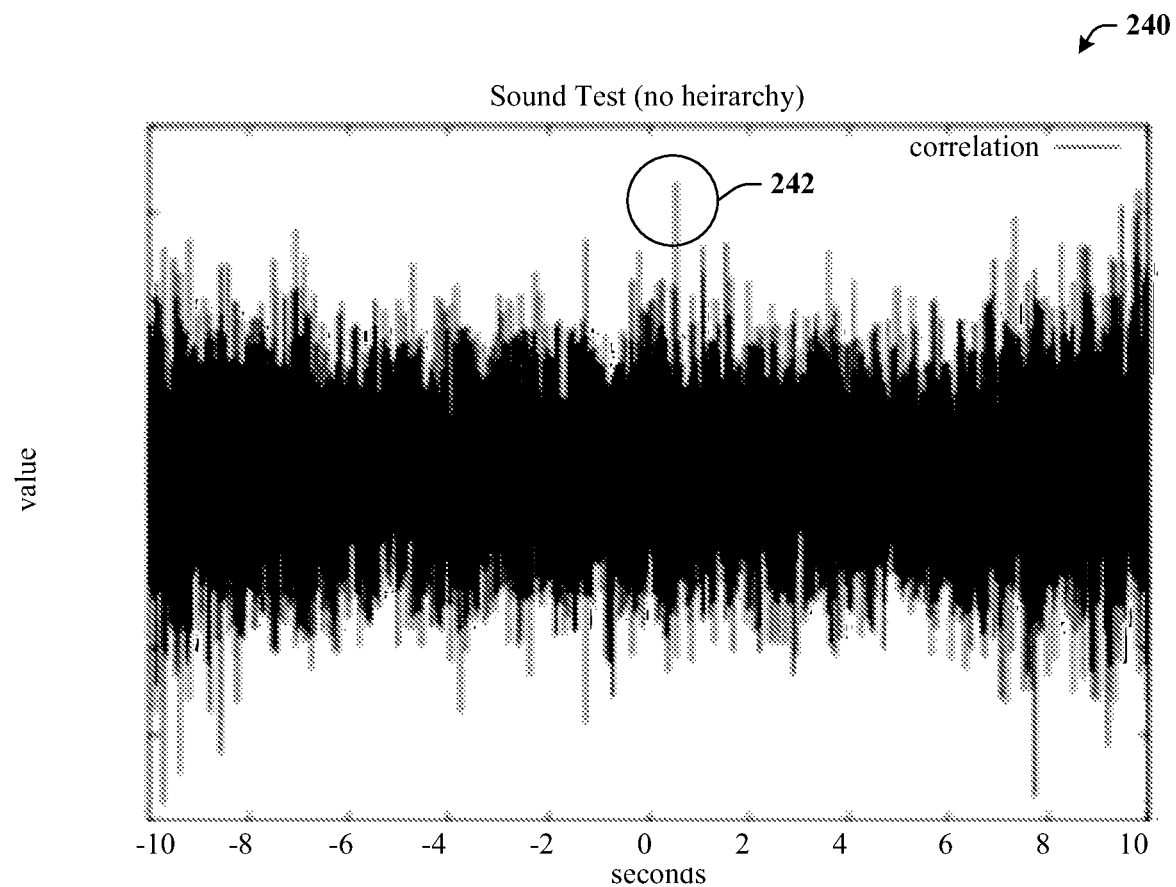

FIG. 2D illustrates example results 230 when averaging together 96 samples at a time. In this case, the maximum peak is identified by reference numeral 232. These results yield a value for timing offset 114 of approximately 8.5 seconds, which indicates the results are not entirely reliable since the correct value is known to be 0.5 seconds. FIG. 2E illustrates example results 240 when averaging together 128 samples at a time. In contrast to results 230 of FIG. 2D, the maximum positive peak (e.g., reference numeral 242) results in a correct determination of timing offset 114.

Figure 3A:
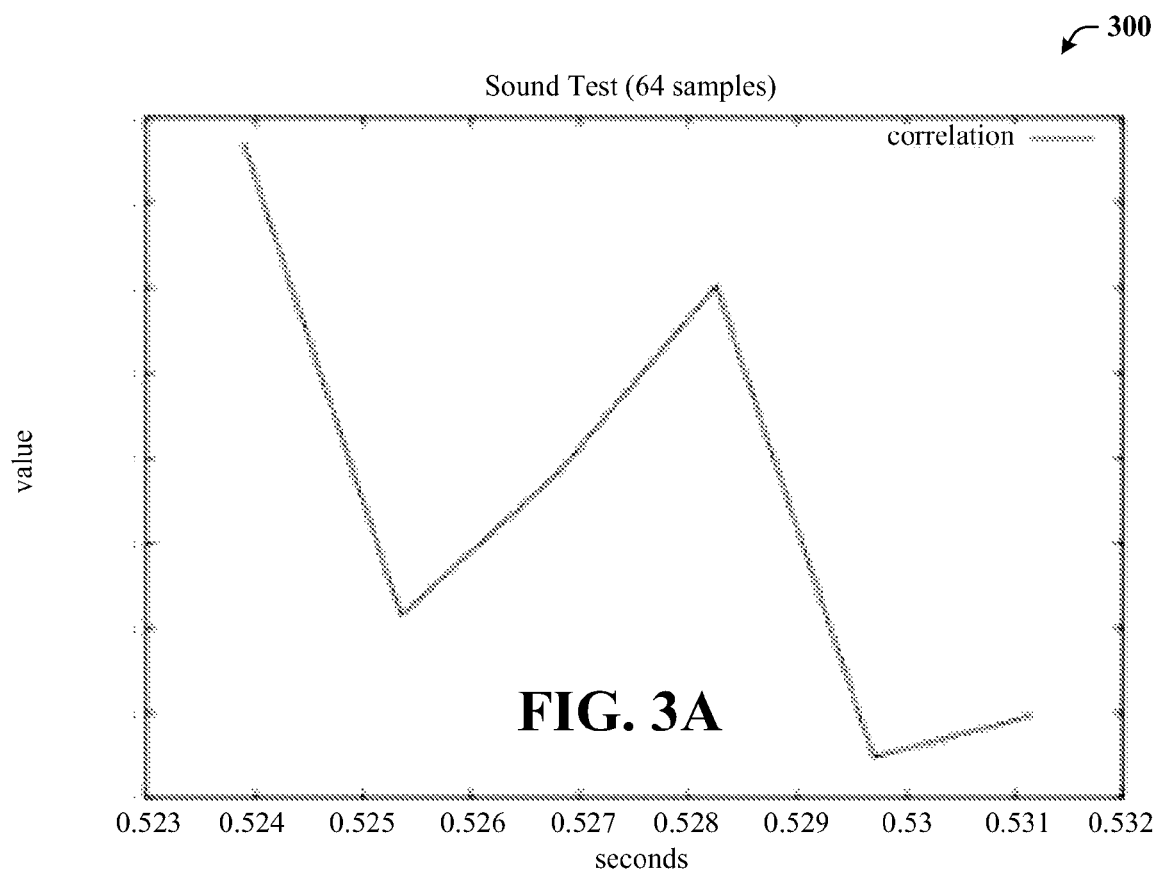
FIGS. 3A and 3B illustrate various results of example cross correlations according to an hierarchical approach.
Figure 3B:
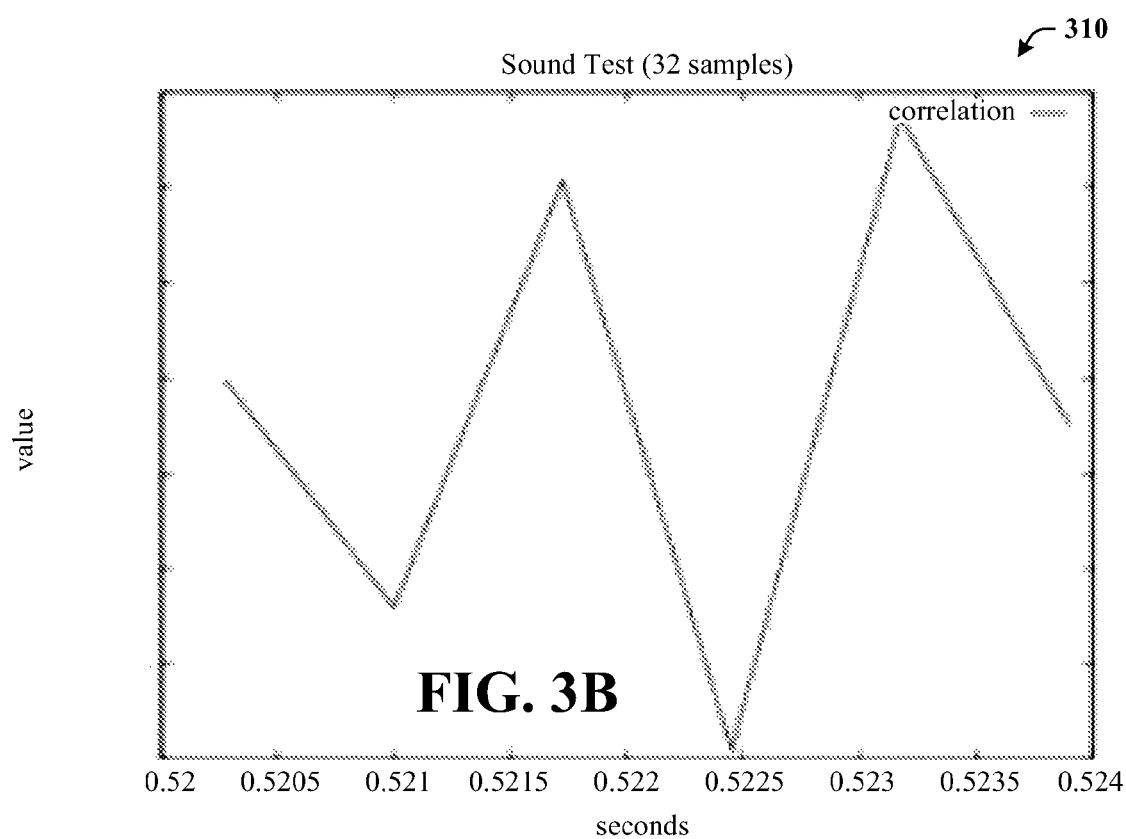

It is understood that when determining timing offset 114 the notion of hierarchy can be employed. For example, a large step can be initially utilized (e.g., a large number of averaged samples) followed by a drill-down on the section with the largest peak with a smaller step (e.g., a smaller number of average samples). FIG. 3A illustrates example results 300 when averaging together 64 samples at a time over a range initially determined in a hierarchical fashion (e.g., the initial peak determined utilizing a step of 128 as illustrated by FIG. 2E). In this case, timing offset 114 can be determined to be approximately 0.524 seconds. FIG. 3B illustrates example results 310 when averaging together 32 samples at a time over a range initially determined in a hierarchical fashion, which also yields a value for timing offset 114 of approximately 0.524 seconds, or more precisely ~0.5232 seconds.

Referring back to FIG. 1, it is appreciated that offset component 112 can provide timing offset 114 to mixing component 116. Mixing component 116 can be configured to construct enhanced audio 118 that is an audio processing mix of audio reference 104 and audio content 108 aligned in accordance with timing offset 114. Thus, enhanced audio 118 can be a properly offset mixed compilation of audio content 108 and audio reference 104. In an alternative embodiment, enhanced audio 118 can be the audio reference 104 along with additional information such as information associated with timing offset 114 or a mixing ratio (detailed infra) such that enhanced audio 118 can be applied to media item 110 with additional processing.

Figure 4:
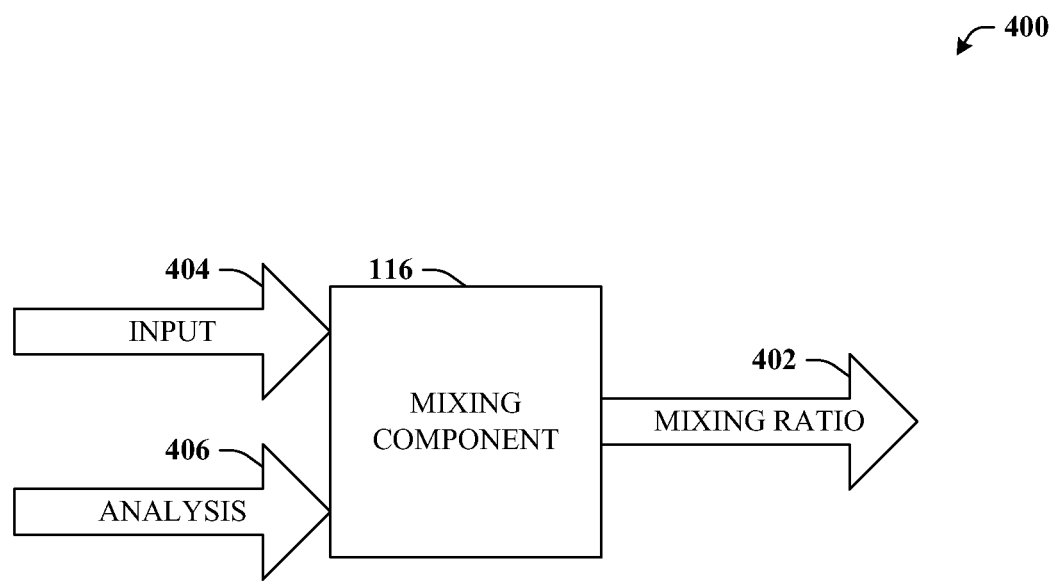
FIG. 4 illustrates a functional block diagram depicting additional aspects associated with the mixing component.

While still referring to FIG. 1, but turning as well to FIG. 4, system 400 is depicted. System 400 illustrates additional aspects associated with mixing component 116. In particular, mixing component 116 can be further configured to construct enhanced audio 118 based upon mixing ratio 402. Mixing ratio 402 can be associated with a degree of bias for audio reference 104 relative to audio content 108 when mixing the two audio streams and/or channels. In one or more embodiments, mixing ratio 402 can be determined based upon input 404 received, e.g., from a user. For instance, the user might opt to bias mixing ratio 402 toward the audio content 108 when, for example, media item 110 includes substantial amounts of other audio information such as when media item 110 relates to a speech and audio content 108 (e.g., a theme song) is less important than the audio associated with the speaker. In contrast, the user might choose to bias mixing ratio 402 toward audio reference 104 when, for instance, media item 110 has very little additional audio information or when such additional information is less essential to the production such as for a video of a dance routine.

In one or more embodiments, mixing ratio 402 can be determined based upon analysis 406. Analysis 406 can be directed to an automated analysis of the audio portions of media content 110. If substantial amounts of those audio portions include unique, non-noise and/or non-essential sounds not included in or represented by audio reference 104, then mixing ratio 402 can be biased toward audio content 108. If there are little or no unique sounds, then mixing ratio 402 can be biased toward audio reference 104. As another example, analysis 406 can relate to an examination of a category or classification (speech, ceremony, dance, etc.) of media item 110. For example, certain categories of media item 110 can be associated with predetermined default mixing ratios 402.

Figure 5:
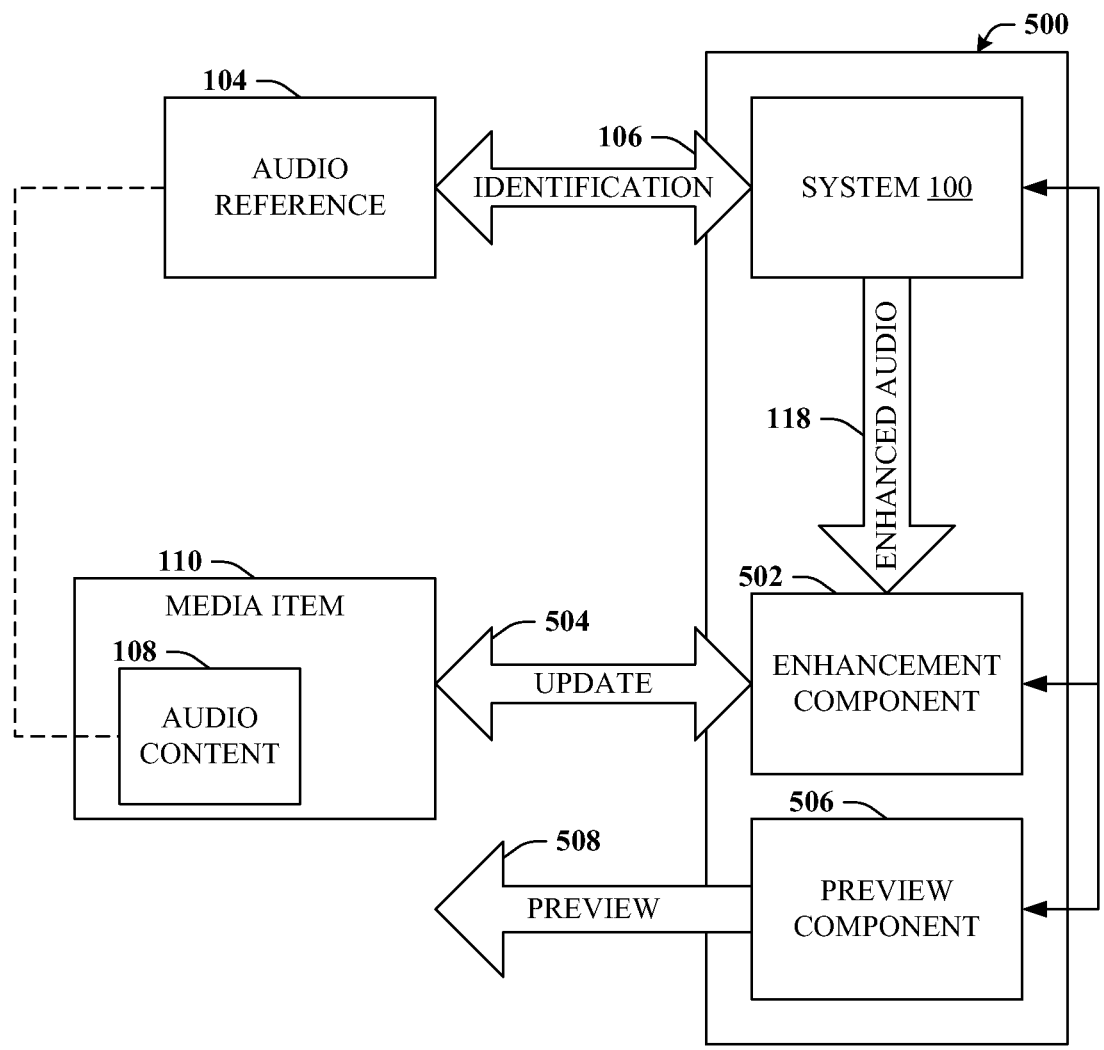
FIG. 5 illustrates a high-level functional block diagram of an example audio enhancement system that can update and/or present an updated version of media item 110 that includes enhanced audio.

Referring now to FIG. 5, system 500 that can update and/or present an updated version of media item 110 that includes enhanced audio 118. System 500 can include all or a portion of the components detailed in connection with system 100 of FIG. 1. Thus, audio reference 104 can be located (via identification 106) and enhanced audio 118 can be generated as detailed supra. System 500 can further include enhancement component 502 that can receive enhanced audio 118. Enhancement component 502 can be configured to update media item 110 with enhanced audio 118.

In one or more embodiments, enhancement component 502 can update (e.g., via update 504) a source file associated with media item 110 to include enhanced audio 118. Therefore, media item 110 is altered at the source and subsequent accesses to media item 110 (e.g., by content consumers who access media item 110 through a media hosting site) will be presented with a version that includes enhanced audio 118. Additionally or alternatively, update 504 can operate "on-the-fly". For instance, enhancement component 502 can update a presentation (e.g., a streaming media presentation) of media content 110 to include enhanced audio 118. In the latter case, inclusion of enhanced audio 118 is not wholly dependent upon settings, selections, or other characteristics associated with the user who uploaded media item 110. Rather, inclusion of enhanced audio 118 can be based entirely or partially upon settings, selections, or other characteristics associated with the content consumer. For example, in either case, one or the other of the content consumer and the user who uploaded media item 110 might have different authorizations, different privileges, and/or different levels of access to audio references or access to different sets of audio references.

System 500 can also include preview component 506 that can be configured to present preview 508 of media item 110 with enhanced audio 118. Accordingly, a user can readily discern the differences extent in media item 110 following update 504. In particular, the user can observe media item 110 with enhanced audio 118 as well as media item 110 in its original form or in any transitional form (e.g., various mixing ratios 402 or other editor changes). In one or more embodiments, preview 508 presents enhanced audio 118 for a first period and audio content for a second period during presentation of preview 508. Such can be accomplished by presenting a single video channel associated with media item 110 that cycles back and forth (e.g., every 5 seconds or another interval) between the two distinct audio channel outputs. Thus, the user can quickly determine the differences between media item 110 with and without enhanced audio 118 as well as various other changes made to media item 110 such as cycling between two versions of media item 110 with different mixing ratios 402, etc. As another example, preview component 506 can be further configured to concurrently present two versions of media item 110, wherein a first version presents audio reference 104 (and/or enhanced audio 118) and a second version presents audio content 108. Thus, two versions of media content 110 can be presented, e.g., side-by-side, with audio from each version being output in succession at predetermined intervals.

It is understood that all or a portion of the various systems or components described herein can be included in a server associated with a content hosting site or service. Additionally or alternatively, all or a portion of the various systems or components described herein can be included in or communicatively coupled to (e.g., via a communications network such as the Internet) a video or other content editor, encoder/decoder, or player.

Figure 6:
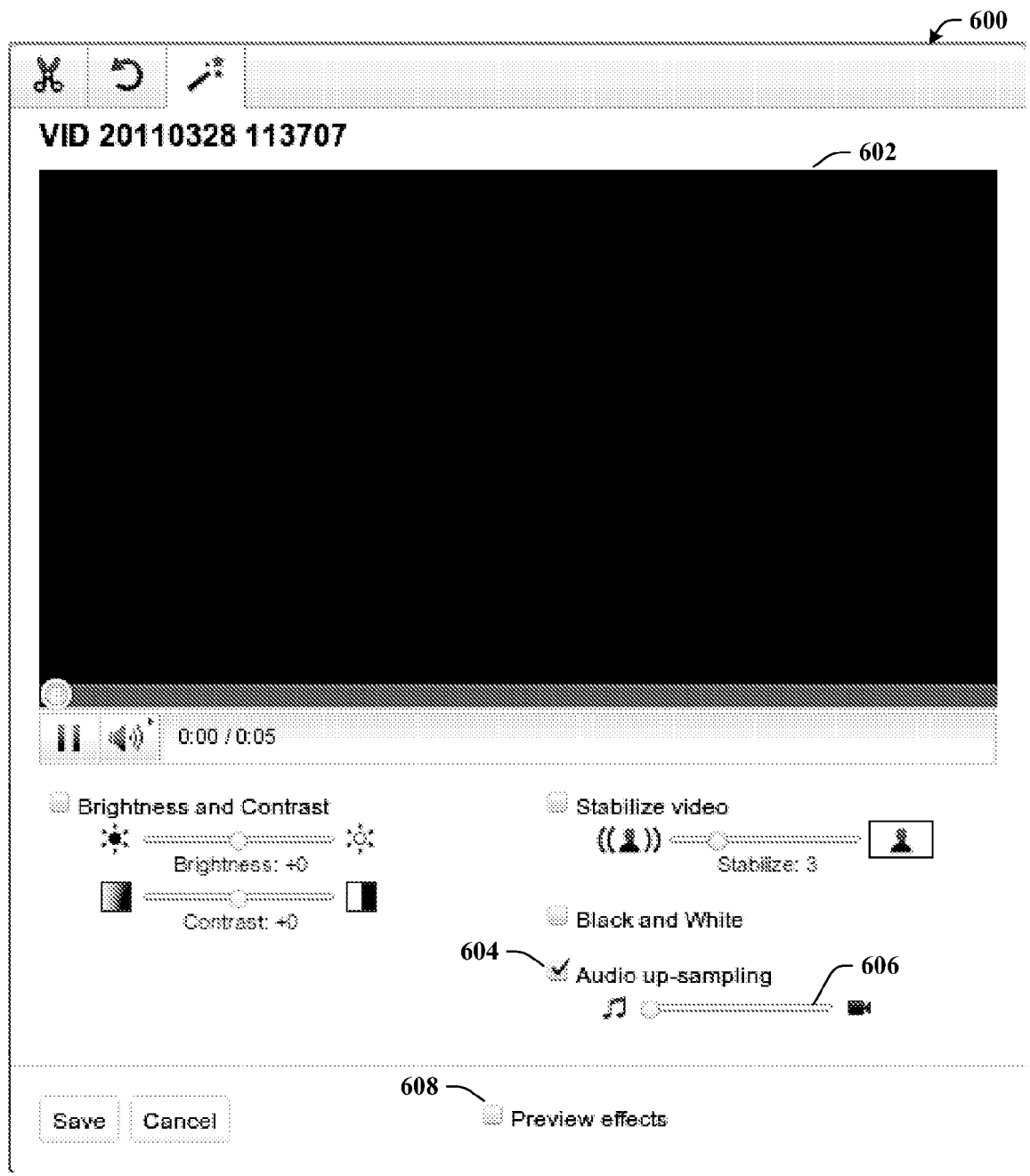
FIG. 6 illustrates an example graphical representation of an example user interface associated with a content editor.

FIG. 6 depicts example interface 600. Example interface 600 illustrates a user interface associated with a content editor. Example interface 600 includes presentation section 602 in which one or more media items (e.g., media item 110) can be presented. Example interface 600 also includes various settings and/or configurations including audio up-sampling 604, slider 606, and preview selection 608. When a user is editing a particular media item, the disclosed subject matter can automatically examine audio content included in the media item and attempt to locate an audio reference that matches some portion of the audio content. If a matching audio reference is located, then audio up-sampling 604 can be displayed and/or selectable. Otherwise, audio up-sampling box 604 can be masked or ghosted and non-selectable. If the user selects audio up-sampling box 604, the check mark can appear and the disclosed subject matter can automatically determine a suitable timing offset for the audio reference relative to the original audio content.

Furthermore, by selecting box 604, slider 606 can be unmasked or un-ghosted or otherwise visible and/or adjustable by the user. Slider 606 can be employed to set a mixing ratio for the mixing of the audio reference and the audio content of the media item. In addition, preview selection 608 can be provided. If selected by the user, a preview of the modified media item can be presented in presentation section 602 along with accompanying enhanced audio.

Figure 7:
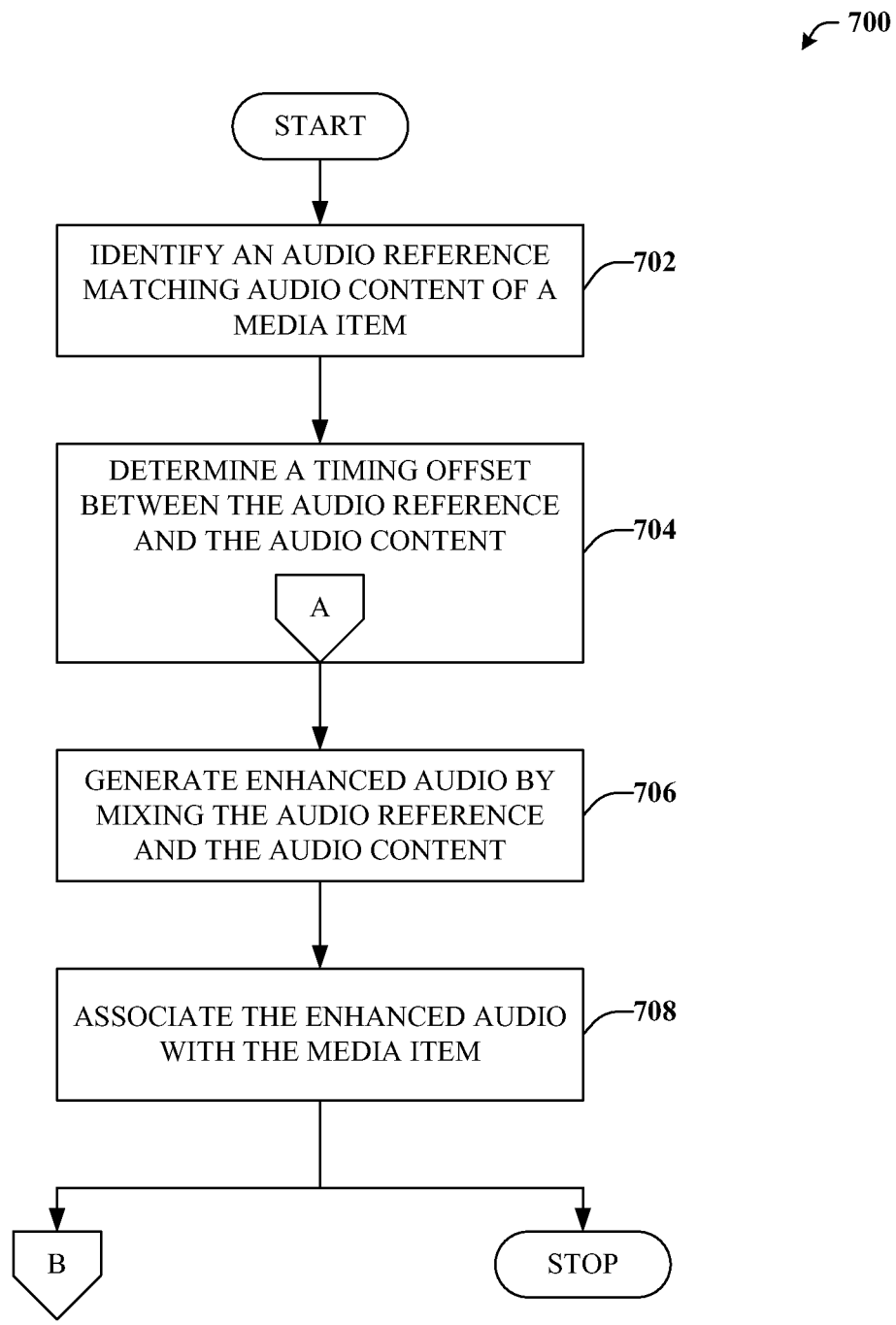
FIG. 7 illustrates an example methodology for enhancing audio associated with media content.

Referring now to FIG. 7, exemplary method 700 for enhancing audio associated with media content is depicted. Generally, at reference numeral 702, an audio reference matching audio content of a media item can be identified (e.g., by an identification component). For example, the audio content of the media item such as a video can be examined to determine a particular song included in that video. If that song can be found in a store of audio references, typically of high quality, then the audio reference match has been identified.

At reference numeral 704, a timing offset between the audio reference and the audio content can be determined (e.g., by an offset component), which is further detailed with reference to FIG. 8. The timing offset can be precise enough to enable high quality mixing of the audio reference and the audio content without undesired effects such as an echo effect. At reference numeral 706, enhanced audio can be generated (e.g., by a mixing component) by mixing the audio reference and the audio content aligned according to the timing offset. Thus, the audio stream for the audio reference can be properly aligned with the audio stream of the audio content in order to generate the enhanced audio. At reference numeral 708, the enhanced audio can be associated with the media item (e.g., by an enhancement component), which is further detailed in connection with FIG. 9.

Figure 8:
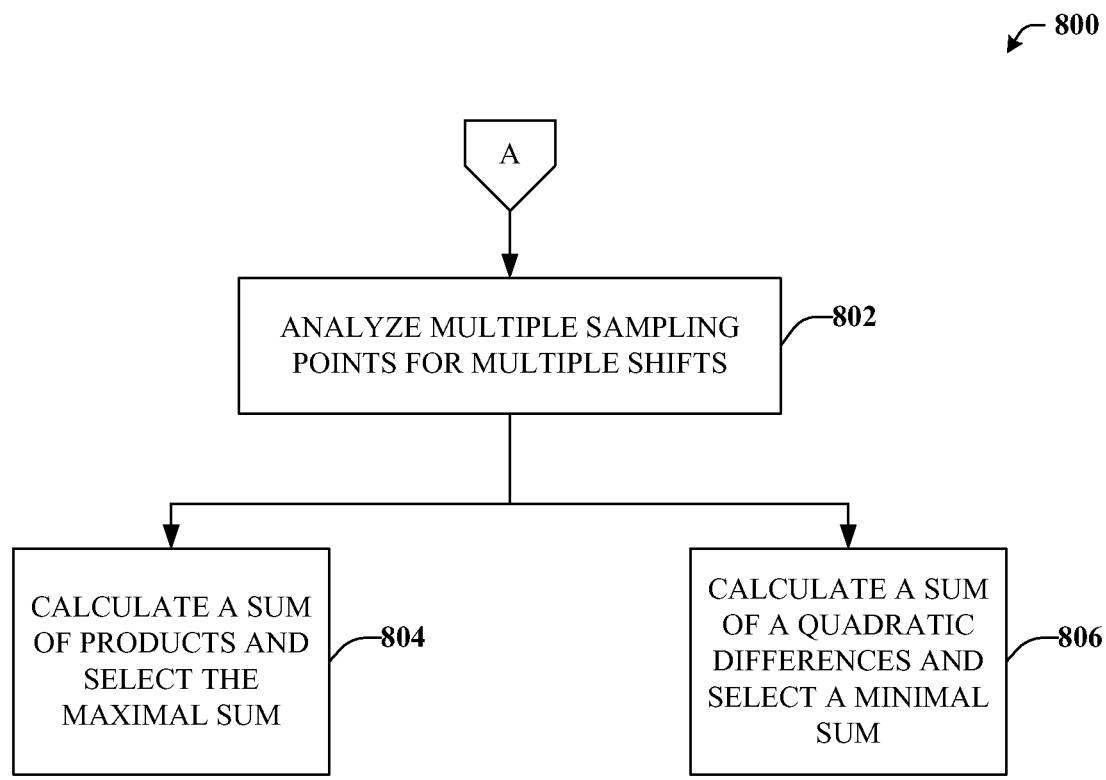
FIG. 8 illustrates an example methodology for providing various non-limiting examples for determining the timing offset.

Turning now to FIG. 8, example method 800 is illustrated. Method 800 provides various non-limiting examples for determining the timing offset. At reference numeral 802, determining the timing offset as detailed in connection with reference numeral 704 of FIG. 7 can include analyzing multiple sampling points of the audio reference and the audio content for multiple shifts between the audio reference and the audio content. At reference numeral 804, determining the timing offset includes calculating a sum of products of the sampling points for the multiple shifts and selecting the timing offset from among the multiple shifts with a maximal sum. At reference numeral 806, determining the timing offset includes calculating a sum of a quadratic difference for the multiple shifts and selecting the timing offset from among the multiple shifts with a minimal sum.

Figure 9:
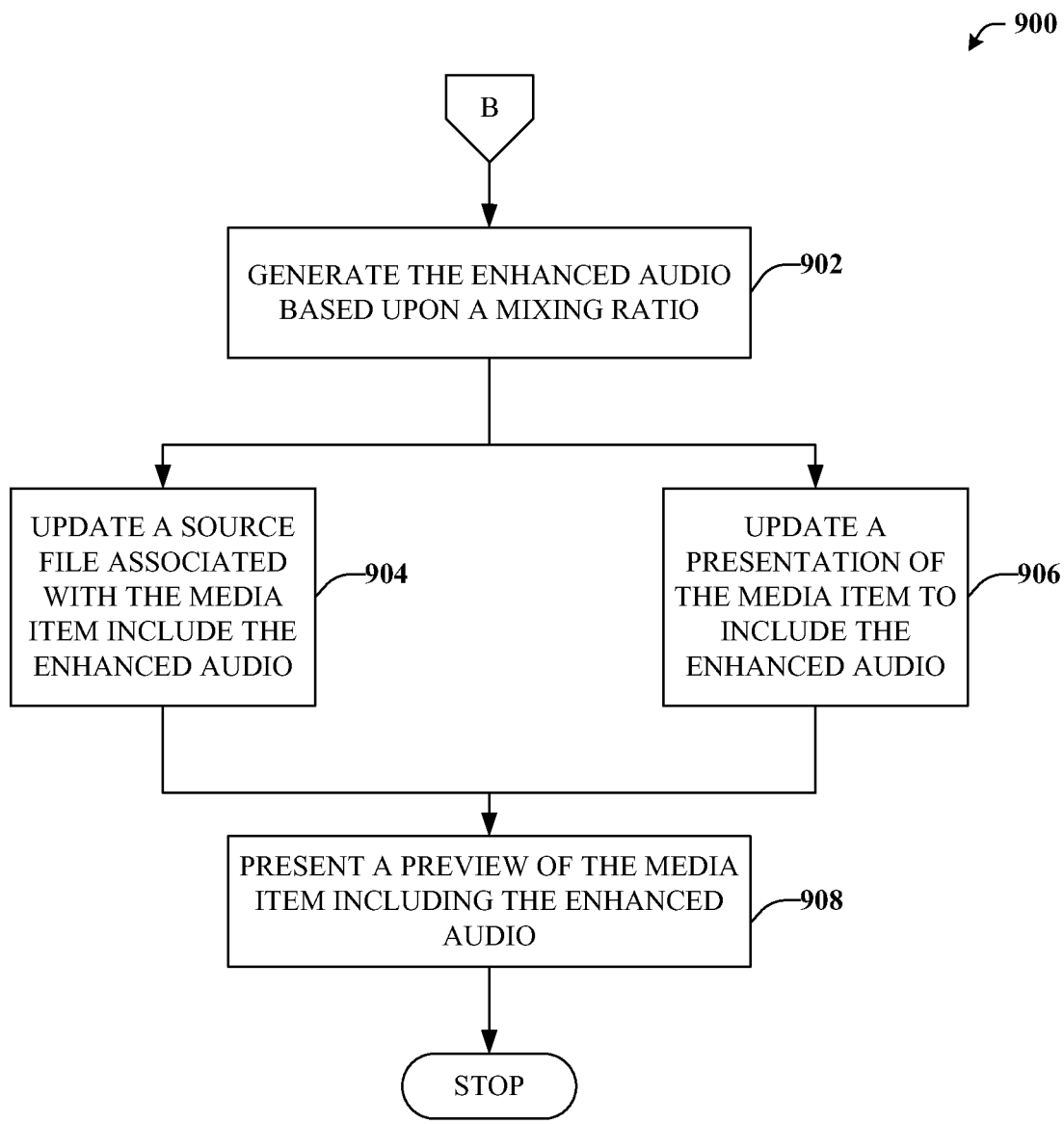
FIG. 9 illustrates an example methodology for providing additional non-limiting features or aspects in connection with generating and associating the enhanced audio.

Referring to FIG. 9, example method 900 is depicted. Method 900 provides additional non-limiting features or aspects in connection with generating, associating, and presenting the enhanced audio. At reference numeral 902, generating the enhanced audio in connection with reference numeral 706 in FIG. 7 can be based upon a mixing ratio associated with a bias for the audio reference relative to the audio content. For example, audio content that has substantial amounts of unique sounds (e.g., distinct from content included in audio reference) can have a mixing ratio setting that is biased toward the audio content, and biased toward the audio reference otherwise.

At reference numeral 904, associating the enhanced audio with the media item as detailed in connection with reference numeral 708 of FIG. 7 can include updating a source file associated with the media item to include the enhanced audio. At reference numeral 906, associating the enhanced audio with the media item can include updating a presentation of the media item to include the enhanced audio.

At reference numeral 908, a preview of the media item including the enhanced audio can be presented. For example, the preview can include a presentation that periodically alternates between the original audio content and the enhanced audio to highlight the various audio improvements applied to the media content.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
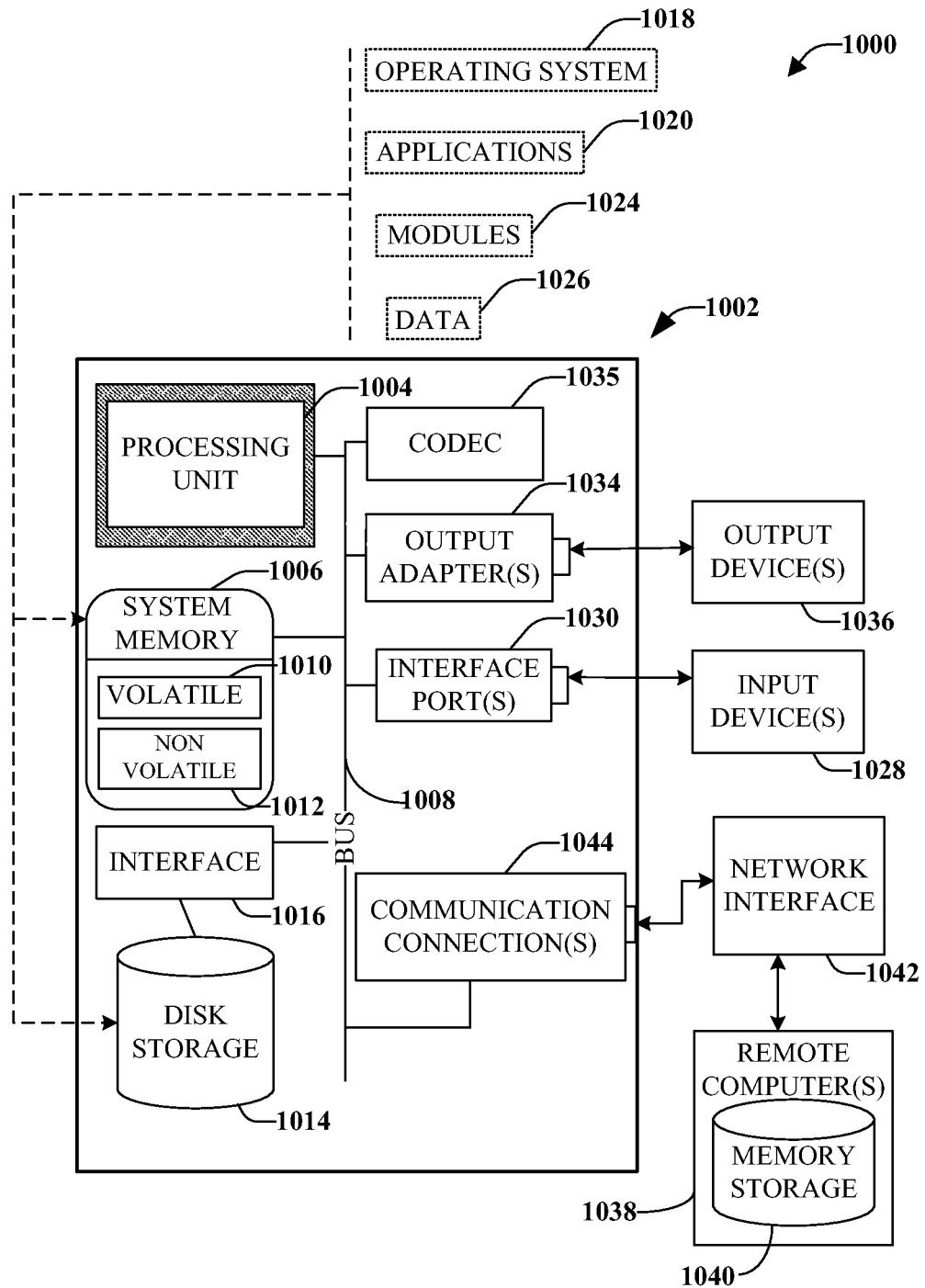
FIG. 10 illustrates an example schematic block diagram for a computing environment in accordance with the subject specification.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, a combination of hardware and software, or software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018.

Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
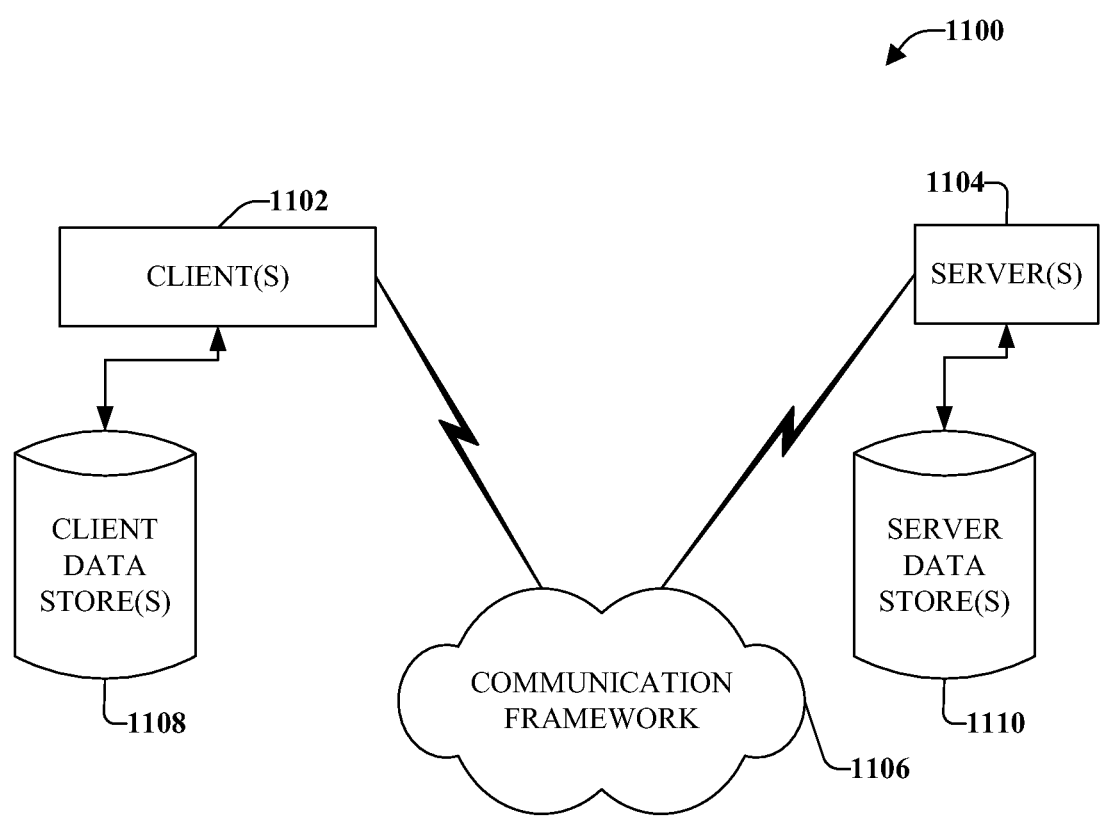
FIG. 11 illustrates an example block diagram of a computer operable to execute the disclosed architecture.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. An audio enhancement system, comprising:
   a memory that stores computer executable components; and
   a microprocessor that executes the following computer executable components stored in the memory:
   an identification component configured to identify an audio reference that matches audio content of a media item;
   an offset component configured to analyze N shifts between a reference waveform associated with the audio reference and a content waveform associated with the audio content, where N is an integer and the N shifts represent time-based overlays of the reference waveform and the content waveform, and to determine a timing offset between the audio reference and the audio content; and
   a mixing component configured to construct enhanced audio that is an audio processing mix of the audio reference and the audio content aligned in accordance with the timing offset.

2. The system of claim 1, wherein the media item is a video designated for upload to a video content hosting site by a user associated with the video.

3. The system of claim 1, wherein the audio reference is a higher quality version of the audio content included in the media item.

4. The system of claim 1, wherein the offset component is further configured to calculate at least one product of the reference waveform and the content waveform for a particular shift included in the N shifts.

5. The system of claim 4, wherein the offset component is further configured to sum the at least one product for the particular shift.

6. The system of claim 5, wherein the offset component is further configured to select as the timing offset a best shift, from among the N shifts, with a maximal sum.

7. The system of claim 1, wherein the mixing component is further configured to construct the enhanced audio based upon a mixing ratio associated with a bias for the audio reference relative to the audio content.

8. The system of claim 7, wherein the mixing ratio is determined based upon input received from a user.

9. The system of claim 7, wherein the mixing ratio is determined based upon an automated analysis of the audio content.

10. The system of claim 1, further comprising an enhancement component configured to update the media item with the enhanced audio.

11. The system of claim 10, wherein the enhancement component updates a source file associated with the media item to include the enhanced audio.

12. The system of claim 10, wherein the enhancement component updates a presentation of the media item to include the enhanced audio.

13. The system of claim 1, further comprising a preview component configured to present a preview of the media item with the enhanced audio.

14. The system of claim 13, wherein the preview presents the enhanced audio for a first period and the audio content for a second period during presentation of the media item.

15. The system of claim 13, wherein the preview component is further configured to concurrently present two versions of the media item, wherein a first version presents the audio reference and a second version presents the audio content.

16. The system of claim 1, wherein the media item relates to audio data created by a recording device.

17. The system of claim 16, wherein the audio reference relates to a file located in a store of audio references and is not created by the recording device.

18. A method for enhancing audio associated with a media item, comprising:
   employing a computer-based processor to execute computer executable components stored within a memory to perform the following:
   identifying an audio reference matching audio content of a media item;
   determining a timing offset between the audio reference and the audio content, wherein the determining the timing offset includes analyzing multiple shifts of a reference stream associated with the audio reference and a content stream associated with the audio content, wherein the multiple shifts represent time-based overlays of the reference stream and the content stream;
   generating enhanced audio by mixing the audio reference and the audio content aligned according to the timing offset; and
   associating the enhanced audio with the media item.

19. The method of claim 18, wherein determining the timing offset includes calculating one or more products of the reference stream and the content stream for a particular shift among the multiple shifts.

20. The method of claim 19, wherein determining the timing offset includes summing the one or more products for the particular shift.

21. The method of claim 20, wherein determining the timing offset includes selecting as the timing offset a fit, from among the multiple shifts, with a maximal sum.

22. The method of claim 18, wherein determining the timing offset includes averaging x samples together, wherein x is greater than 1.

23. The method of claim 22, wherein x is between 32 and 64.

24. The method of claim 18, wherein generating the enhanced audio is based upon a mixing ratio associated with a bias for or against the audio reference relative to the audio content based upon a classification of the media item.

25. The method of claim 18, wherein associating the enhanced audio with the media item includes updating a source file associated with the media item to include the enhanced audio based at least partially upon characteristics associated with a user who uploaded the media item.

26. The method of claim 18, wherein associating the enhanced audio with the media item includes updating a presentation of the media item to include the enhanced audio based at least partially upon characteristics associated with a consumer of the presentation.

27. The method of claim 18, further comprising presenting a preview of the media item including the enhanced audio.

28. A system for enhancing audio associated with media content, comprising:
   means for identifying an audio reference matching audio content of a media item;

means for determining a timing offset between the audio reference and the audio content by analyzing multiple shifts of a reference stream associated with the audio reference and a content stream associated with the audio content, wherein the multiple shifts represent time-based overlays of the reference stream and the content stream;

means for generating enhanced audio by mixing the audio reference and the audio content aligned according to the timing offset; and means for associating the enhanced audio with the media item.

29. The system of claim 28, further comprising means for adjusting a mixing ratio between the audio reference and the audio content.

30. The system of claim 28, further comprising means for previewing the media item including the enhanced audio by cycling between the audio content and the enhanced audio.

* * * * *